United States Patent [19]

Huelsbergen et al.

[11] Patent Number: 6,052,699
[45] Date of Patent: Apr. 18, 2000

[54] GARBAGE COLLECTION WITHOUT FINE-GRAIN SYNCHRONIZATION

[75] Inventors: Lorenz Francis Huelsbergen, Hoboken; Philip Steven Winterbottom, Gillette, both of N.J.

[73] Assignee: Lucent Technologies Inc., Murray Hill, N.J.

[21] Appl. No.: 08/987,030

[22] Filed: Dec. 10, 1997

Related U.S. Application Data

[60] Provisional application No. 60/033,303, Dec. 11, 1996.

[51] Int. Cl.[7] .................................................. G06F 12/02
[52] U.S. Cl. ........................ 707/206; 711/171; 711/173; 711/147; 711/168; 711/162; 707/204
[58] Field of Search ..................................... 711/147, 168, 711/173, 171, 172, 162; 707/206, 204

[56] References Cited

U.S. PATENT DOCUMENTS

| | | | |
|---|---|---|---|
| 5,088,036 | 2/1992 | Ellis et al. ................................ | 395/425 |
| 5,293,614 | 3/1994 | Ferguson et al. ........................ | 395/600 |
| 5,355,483 | 10/1994 | Serlet ........................................ | 395/650 |
| 5,485,613 | 1/1996 | Engelstad et al. ....................... | 395/650 |
| 5,535,390 | 7/1996 | Hildebrandt ............................. | 395/700 |

OTHER PUBLICATIONS

L. Lamport, "Garbage Collection With Multiple Processes: An Exercise in Parallelism" Proceedings of the International Conference on Parallel Processing, pp. 50–54, Aug. 1976.

E. W. Dijkstra, L.Lamport, A. J. Martin, C.S. Scholten and E.F.F.M. Steffens, "On–the–Fly Garbage Collection: An Exercise in Cooperation," *Communications of the ACM*, pp. 966–975, vol. 21, N. 11, Nov. 1978.

C. Queinnec, B. Beaudoing, J.P. Queille, "Mark During Sweep rather than Mark Then Sweep", *Parle*, pp. 224–237, 1989.

H. G. Baker, Jr. "List Processing in Real Time on a Serial Computer", *Communications of the ACM*, pp. 280–294, vol. 21, No. 4, Apr. 1978.

G. L. Steele, Jr., "Multiprocessing Compactifying Garbage Collection", *Communications of the ACM*, pp. 495–508, vol. 18, No. 9, Sep. 1975.

P. R. Wilson, "Uniprocessor Garbage Collection Techniques", *International Workshop on Memory Management*, Springer–Verlag, 1992.

C. Queinnec, B. Beaudoing, J.P. Queille, "Mark During Sweep rather than Mark Then Sweep", *Parle '89*, LNCS 365, Springer–Verlag, Jun. 1989.

*Primary Examiner*—Hiep T Nguyen
*Attorney, Agent, or Firm*—Donald P. Dinella

[57] ABSTRACT

A garbage collection technique for the concurrent operation of a mutator and garbage collector (e.g., marker and sweeper) without requiring fine-grain synchronization or atomicity amongst the mutator, marker and sweeper. The garbage collector employs three threads for concurrently executing the mutator, marker and sweeper, and operates through a series of so called epochs (i.e., individual garbage collection cycles) wherein each epoch (1) runs the mutator; (2) marks all objects that were reachable (i.e., allocated) in the previous epoch with the present epoch's color; and (3) reclaims any objects marked as garbage. Significantly, the object coloring scheme used in the garbage collector eliminates the need for fine-grain synchronization or atomicity by maintaining the invariant that the mutator never sees an object colored with the sweeper's color. Further, only the marker may alter an object's color during an epoch further eliminating the need for fine-grain synchronization or atomicity between the mutator, marker and sweeper.

12 Claims, 5 Drawing Sheets

FIG. 1
(PRIOR ART)

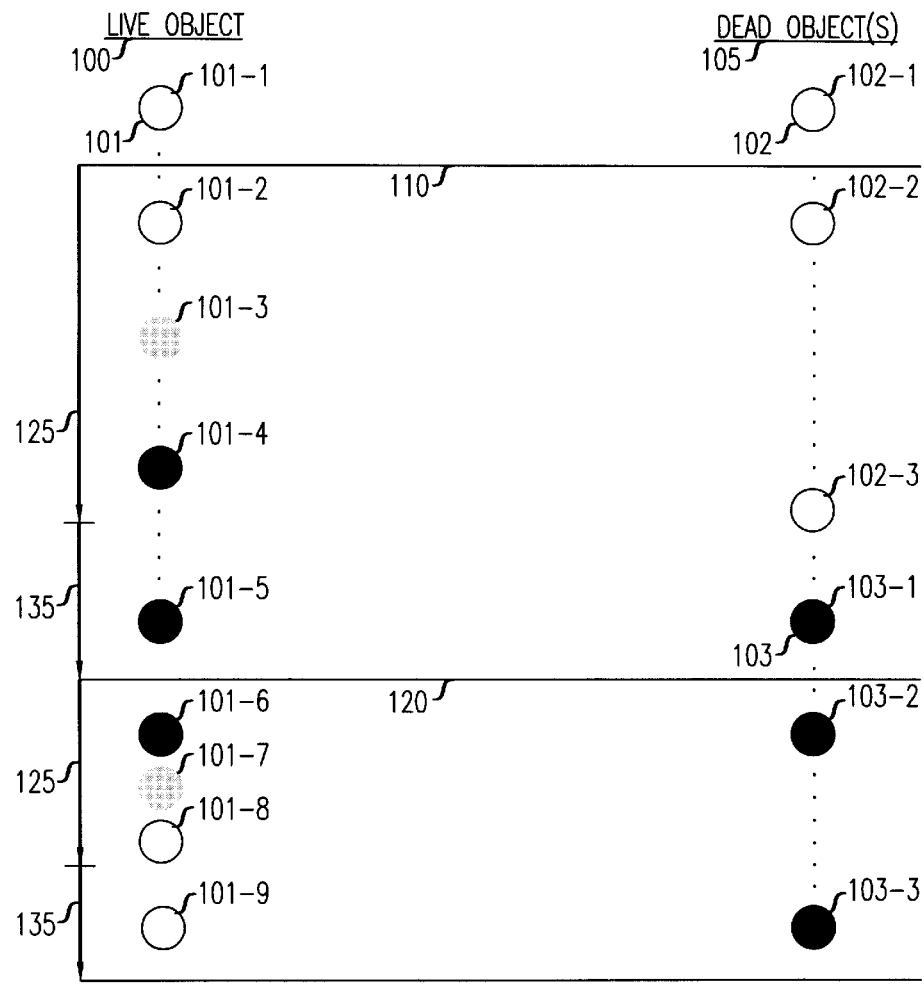

FIG. 3

```
301 ┌ big int epoch=2;                                    300
302 ┌ root_set_t roots={};
303 ┌ thread_t mutator, marker, sweeper;

304 ┌ forever {
    305 ┌ mutator ← make_thread mutate (COLOR(epoch));
    306 ┌ marker  ← make_thread mark (roots, COLOR(epoch));
    307 ┌ sweeper ← make_thread sweep (COLOR(epoch-2));
    308 ┌ barrier_sync {marker, sweeper};
    309 ┌ /* invariant: all reachable data have COLOR (epoch) */
    310 ┌ suspend_thread mutator;
    311 ┌ roots ← get_roots(mutator);
    312 ┌ delete_threads {mutator, marker, sweeper};
    313 ┌ epoch++;
    314 ┌ }
```

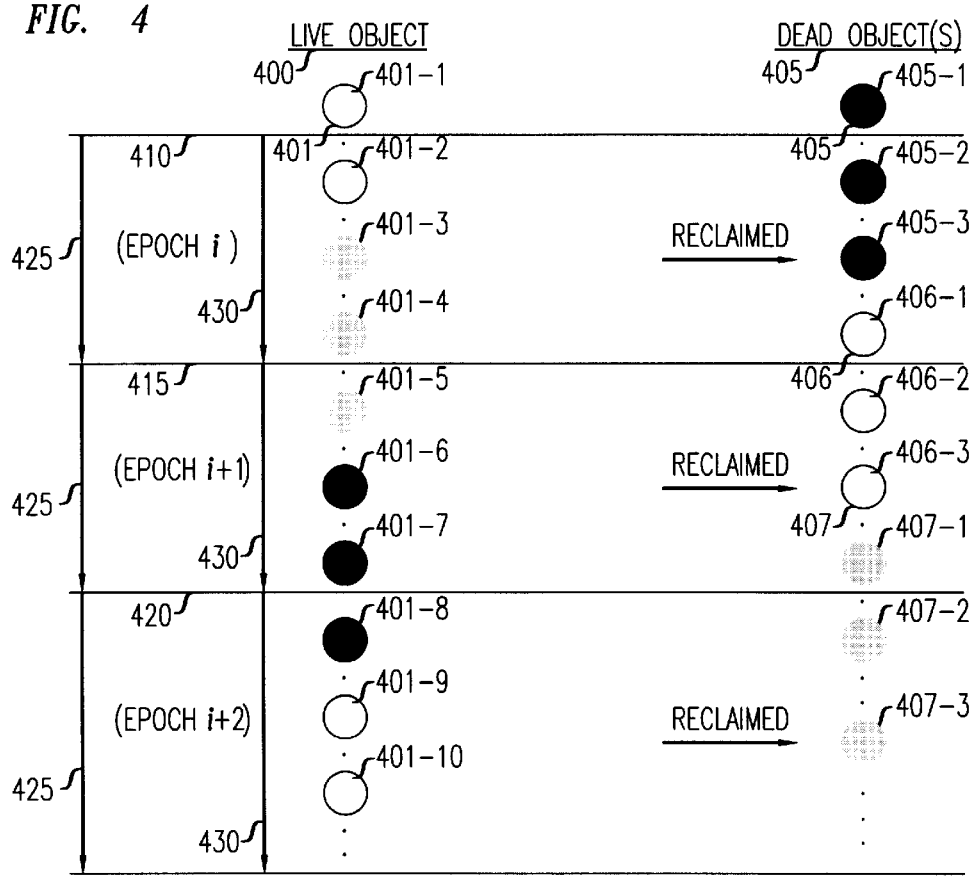

```
        big int epoch=2;                              500
        root_set_t roots={};
    511⌐root_set_t stores={};
        thread_t mutator, marker, sweeper;

forever {
            mutator  ← make_thread mutate (stores, COLOR(epoch));
            marker   ← make_thread mark (stores, roots, COLOR(epoch));
            sweeper  ← make_thread sweep (COLOR(epoch-2));
            barrier_sync {marker, sweeper};
            suspend_thread mutator;
            while (stores = 0) {
                resume_threads {mutator, marker};
     510 {      barrier_sync {marker};
                suspend_thread mutator;
            {

/* invariant: all reachable data have COLOR (epoch) */
            roots    ← get_roots(mutator);
            delete_threads {mutator, marker, sweeper};
            epoch++;
        }
```

FIG. 6

```
typedef struct root_list {
  root_t root;
  struct root_list *next;                              600
} root_set_t;

root_set_T *root_set=NULL;    /* set of elements */
root_set_t *last=NULL;        /* last root_set capture */
root_set_t *before_last=null; /* before_last root_set capture */
root_set_t *this=NULL;        /* next element to remove */
/* invariant: 'this' always lies between 'last' and 'before_last' inclusive. */
```

```
/* remove():
 * Returns the next not yet removed element from 'root_set', NULL if there currently
 isn't an element in 'root_set'.
 * Called only by the marker thread.
 */
root_set_t *remove()
{
  root_set_t *tmp;

/* invariant: 'last' and 'before_last' elements, if non-NULL, have already been removed */
  if (this == before_last) {
    before_last = last; this = last = root_set;
  }
  if (this == before_last) return NULL;
  tmp = this; this = this- next;
  return tmp;
}
```
610

```
/* insert(x):
 * Inserts list node 'x' into the root_set for subsequent marker removal.
 * Assumes a root has been encapsulated in a fresh list node 'x' by caller.
 * Called only by the mutator thread.
 */
void insert (root_set_t *x)
{
  x- next = root_set;
  MemoryBarrier(); /* force write of previous line memory */
  root_set = x;
}
```
615

```
/*done():
 * Returns true if every element in the root set has been removed by marker.
 * Must be called with both mutator and marker threads halted, and their memory
 reads/writes complete.
 */
bool_t done()
{
  return before_last == root_set;
}
```

GARBAGE COLLECTION WITHOUT FINE-GRAIN SYNCHRONIZATION

CROSS REFERENCE TO PROVISIONAL APPLICATION

This application claims the benefit of U.S. Provisional Application Ser. No. 60/033,303, filed on Dec. 11, 1996.

FIELD OF THE INVENTION

The present invention relates to memory management in computer systems, and more particularly, to garbage collection in such computer systems.

BACKGROUND OF THE INVENTION

Within conventional computer systems, applications are executed by a microprocessor which necessarily uses memory locations for storing data and instructions. The contents of memory are changing over time such that, at different times, a memory location is said to be allocated, i.e., used, or unallocated, i.e., unused. More particularly, allocated memory locations are those locations that contain data or instructions that are referenced by other allocation memory locations during normal program execution.

For example, in modern object oriented computing, an "object" is data that share a particular attribute and occupy a contiguous region of memory. If all objects in a given computer system are permanent, there is no real concern with regard to memory management. That is, the memory space assigned to each object at the start of program execution never changes. However, in most conventional object oriented systems, objects have varying lifetimes that cannot be predicted in advance such that memory locations will transition between allocated and unallocated states. In order to promote the efficient use of memory, unallocated memory locations must be "reclaimed" so that they may be later allocated as required.

"Garbage" is a well-known term in the computer science arts which refers to memory storage locations which contain data that is no longer being used in, e.g., the execution of an application program. Garbage collection is another well-known term of art used in describing automatic techniques for identifying garbage and reclaiming those memory locations for future allocation. By automatically identifying accessible, and therefore potentially in-use data, e.g., objects, garbage collection routines shoulder the error-prone task of memory allocation and deallocation for the computer programmer. In freeing computer programmers from such low-level detail, garbage collection at a minimum can improve the quality of program code, increase programmer productivity, and reduce program development costs.

Of course, the many advantages associated with garbage collection are not "free" in terms of computing resources. Traditional garbage collection techniques such as "stop & copy", "mark & sweep" and "reference counting" are described by, for example, Paul R. Wilson, "Uniprocessor Garbage Collection Techniques", In *International Workshop on Memory Management*, Springer-Verlag, 1992, and Richard Jones et al., *Garbage Collection Algorithms for Automatic Dynamic Memory Management*, John Wiley & Sons, 1996. The costs associated with such traditional garbage collection techniques manifest themselves, for example, as combinations of increased memory usage, run-time overheads on data accesses, and disruptive latencies in a program's execution. For example, stop & copy garbage collectors require a substantial amount of additional storage for making copies of live, i.e., allocated, data. This is due to the fact that such collectors periodically copy all reachable objects into a second memory space so the first memory space can be reclaimed in its entirety.

Alternatively, mark & sweep collectors employ a "collector" which synchronizes the launching of markers and sweepers for the purpose of garbage collection. Basically, the marker traverses all memory locations and "marks" those which are presently being used by an application (also alternatively referred to as the "mutator" herein and as wellknown in the garbage collection computing arts). Further, objects which remain unmarked are available for reallocation. The sweeper follows the marker and places the free memory locations, i.e., unmarked objects, in a so called "free-list" from which the memory can be reallocated by the computer system. A disadvantage of mark & sweep garbage collection is that the collector must continually step through the entire set of free and in-use memory objects thereby making the total time required for garbage collection directly proportional to the number of the memory objects in the system.

In order to address the inherent costs of garbage collection techniques as described above, the developers of garbage collection routines have incorporated concurrency in their designs whereby garbage collection occurs contemporaneously with application execution, i.e., mutator execution. More particularly, concurrent garbage collection techniques fall generally into one of two classes: (1) variations on mark & sweep collectors, see, for example, E. W. Dijkstra et al., "On-the-fly garbage collection: An exercise in cooperation", *Communications of the ACM*, 21(11):966–975, November 1978 (hereinafter referred to as "Dijkstra"), and G. L. Steele, Jr., "Multiprocessing compactifying garbage collection", *Communications of the ACM*, 18(9):495–508, September 1975; and (2) incremental generational collectors, see, for example, H. G. Baker, "List processing in real time on a serial computer", *Communications of the ACM*, 21(4):280–294, April 1978, A. W. Appel et al., "Real-time concurrent collection on stock multiprocessors", In *Conference on Programming Language Design and Implementation*, pp. 11–20, June 1988, and S. Nettles et al., "Replication-based real-time garbage collection", In *Conference on Programming Language Design and Implementation*, Association for Computing Machinery, June 1993.

Although concurrent garbage collection techniques provide a level of marked improvement over non-concurrent garbage collection, concurrent garbage collectors require substantial synchronization between the application, i.e., mutator, and the garbage collector to ensure data integrity and to avoid interference between the respective activities of the mutator and garbage collector. For example, in Dijkstra, a concurrent mark & sweep garbage collector (hereinafter referred to as "the Dijkstra collector") is described which employs a well-known tricolor abstraction scheme (see, for example, Dijkstra, supra. at pp. 969–972, and Jones et al., supra. at pp. 186–187) to distinguish presently allocated objects from garbage. In particular, conventional tricolor marking employs the following three colors: (1) black—indicates that the object is presently allocated and used; (2) gray—indicates that an object is in a transitional state and is in the process of being retained; and (3) white—indicates objects that are subject to collection, i.e., garbage. For example, the Dijkstra collector at the beginning of the collection cycle uses the tricolor abstraction to color all of the objects in the root set (i.e., the beginning set of objects) the color gray. Depending on their individual allocation status, particular white objects are marked gray by the marker and all children, i.e., descendants attributable to a particular object, of the particular white object are colored gray. After an object's children have been colored gray, the object itself, i.e., the parent, is colored black. As gray objects are generated by Dijkstra's collector these objects are queued for marking. As will be readily understood, objects which retain a white color during the collection cycle are designated as garbage at the end of the marker phase and therefore subject to collection.

At this junction in the operation of Dijkstra's collector (i.e., the end of a collection cycle), the interpretation of the colors white and black, respectively, is reversed from that of the just prior garbage collection cycle. The reversal of the white and black colors occurs, in the Dijkstra collector, at the end of each collection cycle. Significantly, the color gray and the interpretation of gray objects does not change during this transition in the Dijkstra collector and the sweeping phase of this collector must strictly follow the marking phase because of the fact that a white object's color may change (e.g., to gray and later to black) at any point in time during the marking phase. As a result, the Dijkstra collector requires that sweeping always follow marking because it is only at the end of the marking cycle that a determination can be ascertained at to whether certain objects, e.g., white objects, can be reclaimed as garbage.

Furthermore, in order to effectively utilize the tricolor marking scheme, the Dijkstra collector requires so called "fine-grain synchronization" between the mutator and the collector. More particularly, such fine-grain synchronization is realized through the utilization of a write barrier which prevents the mutator from interfering with the collector during garbage collection. Thus, fine-grain synchronization insures that the mutator and collector do not simultaneously access and alter a common object.

Known garbage collection techniques which eliminate this sequential mark-then-sweep requirement are described, for example, in C. Queinnec et al., "Mark DURING Sweep, rather than Mark THEN Sweep", In *Parle*, pp. 224–237, 1989 (hereinafter "the Queinnec collector"), and in L. Lamport, "Garbage Collection with Multiple Processes: An Exercise in Parallelism", In *Proceedings of the International Conference on Parallel Processing*, pp. 50–54, August 1976 (hereinafter "the Lamport collector"). The derivation of both the Queinnec collector and the Lamport collector rely significantly on the principles of the above-described Dijkstra collector but depart in one way from Dijkstra's collector by employing five colors to achieve their concurrency. As one might expect the introduction of five colors in these collector's color abstraction schemes increases the complexity of these two collectors. However, even more importantly, both the Queinnec collector and Lamport collector incorporate the so called "shade" atomic operation used by the Dijkstra collector. That is, the Queinnec collector and the Lamport collector each require frequent inter-processor synchronization amongst their respective marker and mutator during typical collection operations because either the marker or mutator can modify a color (i.e., any of the five colors in the abstraction) visible to the other. As will be appreciated, such inter-processor synchronization, i.e., fine-grain synchronization, comes at an increase in processing overhead.

More particularly, for example, the Queinnec collector provides for concurrent threads of operation for the mutator, marker and sweeper thereby allowing for marking during sweeping. However, such concurrency comes with a significant atomicity requirement. The notion of atomicity in the garbage collection context means that access to a shared memory variable, i.e., a memory location, is mutually exclusive. That is, if one thread, e.g., the mutator, has access to the variable, another thread, e.g., the marker, must wait until the first thread explicitly relinquishes its rights to the variable. In terms of processing requirements, atomicity is an expensive feature because it requires a first thread to indicate to the other threads when the thread is going to "lock" a variable, and then again when the thread is done and "unlocks" the variable. The Queinnec collector utilizes atomic operations in the performance of mutation, marking and sweeping. For example, when an object in the Queinnec collector is being examined by the marker there is a lock placed on that object which prohibits access by the sweeper and/or mutator. More particularly, this collector requires multiple fine-grain synchronizations within a single mark or sweep step, and further requires that mutator operations occur atomically. Thus, in effect, these atomic operations act similar to that as the previously described write barrier and require a significant amount of processing overhead.

Therefore, a need exists for a garbage collection technique which allows for fill concurrency between mutation, marking and sweeping without the need for fine-grain synchronization or atomicity.

SUMMARY OF THE INVENTION

The present invention provides a garbage collection technique for the concurrent operation of a mutator and garbage collector (e.g., marker and sweeper) without requiring fine-grain synchronization or atomicity amongst the mutator, marker and sweeper. In accordance with the invention, three threads are used for concurrently executing the mutator, marker and sweeper. Our inventive garbage collector operates through a series of so called epochs (i.e., individual garbage collection phases) wherein the collector operates in each epoch to concurrently (1) run the mutator; (2) mark all objects that were reachable (i.e., allocated) in the previous epoch with the present epoch's color; and (3) reclaim any objects marked as garbage. Significantly, the object coloring scheme used in the invention eliminates the need for any fine-grain synchronization or atomicity by maintaining the invariant that the mutator and marker never encounters an object colored with the sweeper's color. In accordance with the invention, at the boundaries between consecutive epochs, the garbage collector's colors are remapped, i.e., exchanged. Illustratively, the sweeper color is remapped to the next epoch's mutator color, the mutator color is remapped to the next epoch's marker color, and the marker color is remapped to the next epoch's sweeper color. Such remapping ensures that objects which are garbage will be detected and reclaimed by our collector without any fine-grain synchronization or atomicity between the mutator, marker and sweeper. Further, in accordance with the invention, only the marker may alter an object's assigned color during an epoch thereby eliminating any need for fine-grain synchronization or atomicity between the mutator, marker and sweeper.

In accordance with an embodiment of the invention, the current color used for allocating objects within a particular epoch is determined, illustratively, by the function COLOR (i)=i mod 3, where i is the epoch number. More particularly, at the beginning of an epoch, the mutator is initialized by the color, i.e., the so called mutator color, of the current epoch and thereafter allocates objects by designating objects with its present color, i.e., the mutator color. Illustratively, during the course of mutator execution, the mutator only needs to wait for the sweeper to reclaim a free block when no free block is available from a free-list allocator. Further, during the current epoch, the marker is initialized with a color, i.e., the marker color, determined as a function of the current epoch's mutator color. Thereafter, the marker brings all reachable data, e.g., objects, from the prior epoch up to current status such that the data will be reachable by the mutator in the current epoch. Significantly, in accordance with the invention, once particular objects are designated by the mutator, only the marker may alter the object's color thereby eliminating the need for fine-grain synchronization or atomicity. Further, in accordance with the embodiment of the invention, the sweeper, during each epoch, is initialized with a color, i.e., the sweeper color, as function of the current epoch's color. Thereafter, the sweeper examines particular objects and, if the object carries a designation of the sweeper's color, the object is garbage and returned to the free-list for reallocation.

BRIEF DESCRIPTION OF THE DRAWINGS

FIG. 1 is an example of the transitions which occur for allocated and unallocated objects during garbage collection cycles in a prior art garbage collector which requires fine-grain synchronization;

FIG. 3 represents pseudo-code for implementing an embodiment of the invention as shown in FIG. 2;

FIG. 4 shows an illustrative collection of objects and their state transitions during garbage collection in accordance with the invention;

FIG. 5 represents pseudo-code for implementing a further embodiment of the invention which supports reference update;

FIG. 6 represents C computer source code for implementing an illustrative asynchronous write barrier for use in conjunction with the principles of the invention as shown in FIG. 2.

DETAILED DESCRIPTION

Figure 2:
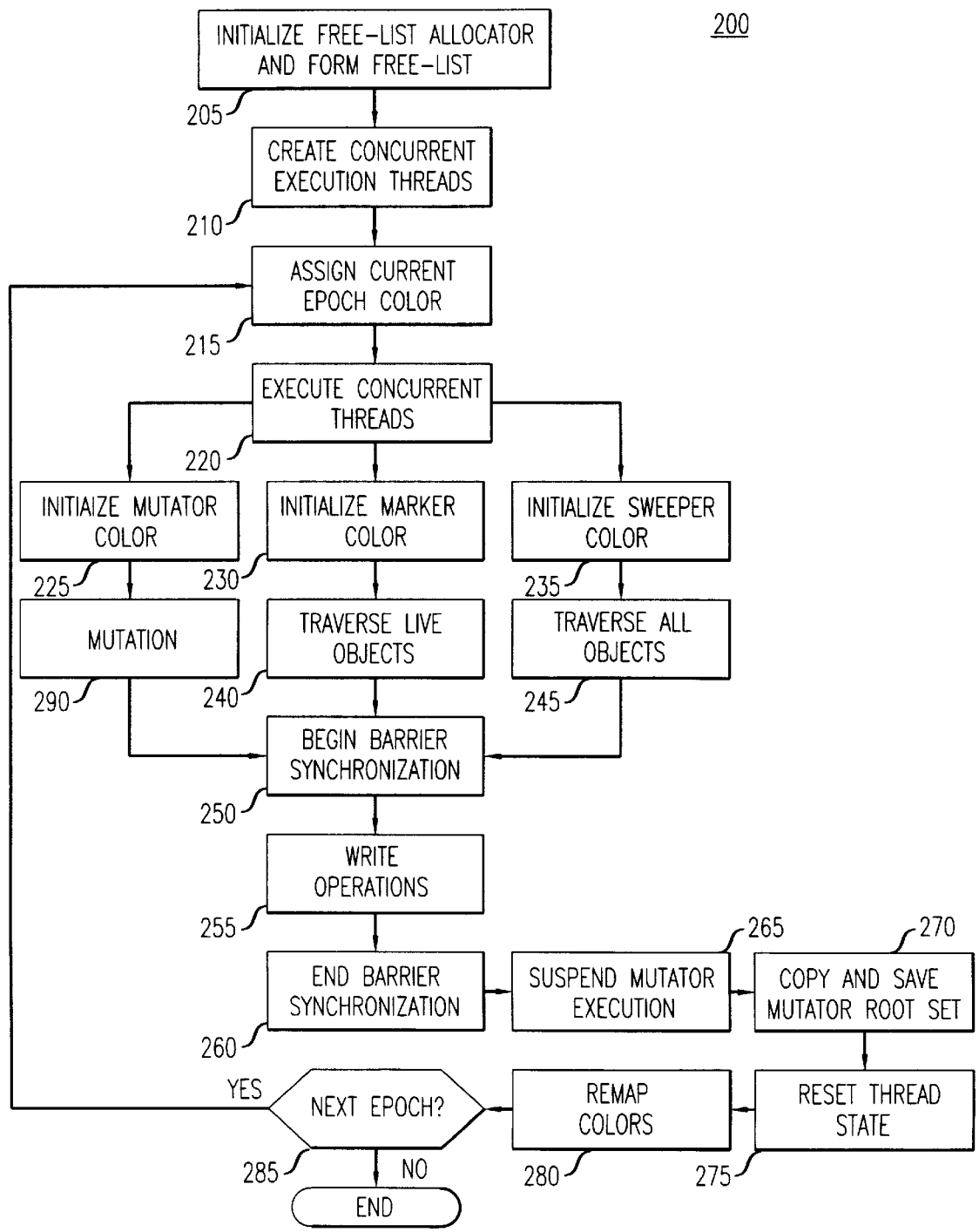
FIG. 2 is a flowchart showing steps for implementing garbage collection in accordance with the principles of the invention.

The present invention provides a garbage collection technique for the concurrent operation of a mutator and garbage collector (e.g., marker and sweeper) without finegrain synchronization or atomicity amongst the mutator, marker and sweeper.

To facilitate an understanding of the invention and the import of its various advantages, an example of a prior art garbage collection technique requiring fine-grain synchronization will be initially discussed. In particular, FIG. 1 is an example of the transitions which occur for allocated and unallocated objects during garbage collection cycles consistent with a prior art garbage collector, e.g. the Dijkstra collector, which requires fine-grain synchronization. This example employs the previously described well-known tricolor abstraction scheme, e.g., as employed in the Dijkstra collector. FIG. 1 shows the traversal of object transition states for an allocated (i.e., a so called "live" object) object example 100, and a series of so called "dead" objects 105, i.e., objects which are not currently in use. Turing our attention first to live object example 100, a series of object transition states 101-1 through 101-9 are shown which depict the different transitional states of live object 101 through two consecutive garbage collection cycles 110 and 120, respectively. As will be appreciated, each object state carries the designation of a particular color, consistent with the conventional tricolor abstraction scheme, as assigned during the garbage collection process. As discussed above, the conventional tricolor abstraction scheme employs three colors, i.e., white, gray and black, for coloring objects during their different transitional states during the garbage collection process. Just prior to entering the first illustrative garbage collection cycle 10, live object 101 has a white object transition state 101-1 indicating that the object has a live state thereby meaning that the object is currently allocated by the mutator. As object 101 enters garbage collection cycle 110 its object transition state 101-1 remains white during the initial stage of operations of marker 125.

As is well-known, this tricolor abstraction scheme, as used in the illustrative garbage collector of FIG. 1, employs a particular object coloring mechanism during the garbage collection phases. That is, objects in the root set are first colored gray at the beginning of a garbage collection cycle. As will be appreciated, the root set is a set of objects from which all live objects are reachable. Thereafter, particular gray objects are colored, i.e., marked, black by the marker, and all objects which are descendants, i.e., children, of that particular black object are colored gray. As gray objects are generated during a garbage collection cycle, these objects are queued for marking. Those objects that retain their white color during a collection phase are designated as garbage at the end of the marking phase within a particular garbage collection cycle. Thereafter, the sweeper phase of the garbage collection cycle collects those objects designated as garbage.

After the marker 125 and sweeper 135, of the illustrative garbage collector of FIG. 1, have completed their traversal of objects, the current garbage collection cycle nears completion and just prior to entering the next garbage collection cycle the interpretation of the colors white and black, respectively is reversed. For example, if white is being used for designating live objects in the current collection cycle, the color white will designate dead objects in the next consecutive garbage collection cycle. Significantly, in accordance with this prior art technique, the color gray does not change between garbage collection cycles. The gray color is always used a transitional mechanism in this scheme. Furthermore, sweeping must strictly follow marking since a white object's color may change (e.g., to gray and later to black) at any point in the marking phase of the garbage collection cycle. Further aspects of the conventional tricolor coloring scheme are described below.

In particular, focusing our attention back to FIG. 1, live object 101 transitions from white (object transition state 101-2) to gray (object transition state 101-3) to black (object transition state 101-4) during the execution of marker 125. Thereafter, live object 101 retains its black color (transition state 101-5) throughout the execution of sweeper 135. As discussed above, at the end of garbage collection cycle 110, the garbage collector's colors are remapped, that is, the interpretation of the colors white and black, respectively, is reversed. Thus, as live object 101 enters the next garbage collection cycle 120 with a color black (object transition state 101-6) it will be marked gray (object transition state 101-7) then marked white (object transition state 101-8) by marker 125. One must keep in mind that, in garbage collection cycle 120, a white color now designates a live object while a black color now designates garbage. Thereafter, as sweeper 135 executes in garbage collection cycle 120, live object 101 retains its white color (object transition state 101-9) and is not subject to reclamation.

The above details described the transition of a live object during the course of garbage collection using the well-known tricolor abstraction scheme. FIG. 1 also shows an example of the traversal of object transition states for a series dead objects 105. As above, the same two consecutive garbage collection cycles are depicted, 110 and 120, respectively. In this example, dead object 102 has a white object transition state 102-1 just prior to entering garbage collection cycle 110. Being dead, dead object 102 retains its white color (white object transition state 102-2) through the execution of marker 125 and is later reclaimed at, e.g., white object transition state 102-3 by sweeper 135. Further, dead object 103 having black object transition state 103-1 has remained "unmarked" during garbage collection cycle 110 and will be subject to reclamation in the next garbage collection cycle 120. Of course, one must remember that at the end of garbage collection cycle 110, the garbage collector's colors are remapped, in particular, the interpretation of the colors white and black, respectively, is reversed. Thus, dead object 103 begins garbage collection cycle 120 with black object transition state 103-2. With the interpretation of colors being remapped, i.e., reversed, for this cycle, the object will retain its black color (i.e., black carries a dead object designation in this cycle) throughout garbage collection cycle 120. Thereafter, sweeper 135 reclaims dead object 103 at, e.g., black object transition state 103-3.

As will be appreciated from the discussion above, in order to effectively utilize the conventional tricolor marking scheme, the operations of the prior art garbage collector of FIG. 1 require fine-grain synchronization between the mutator and the collector. More particularly, such fine-grain synchronization is realized through the utilization of a write barrier which ensures that the mutator and collector do not simultaneously access and alter a common object. Thus, the collector of FIG. 1 requires that sweeping always follow marking because it is only at the end of the marking cycle that a determination can be made as to whether certain objects can be reclaimed.

Significantly, the present invention provides an efficient garbage collection technique which eliminates the need for fine-grain synchronization or atomicity during garbage collection. Of course, as will be appreciated, conventional multiprocessor computer systems have an inherent form of memory atomicity which manifests itself in such systems as an atomic write operation. In particular, the computer's memory system performs machine-word writes atomically, that is, if memory location "M" holds value "x" before value "y" is written to M, any memory reads of location M will return either value x or value y, but never an intermediate value, e.g., the high order bits of x and the lower order bits of y. Our garbage collection technique recognizes that this inherent atomic write operation exists in such memory systems and the invention is not directed at the elimination of such inherent atomic write operations. Rather the advantages of the invention are the elimination of fine-grain synchronization or atomicity during garbage collection.

Figure 7:
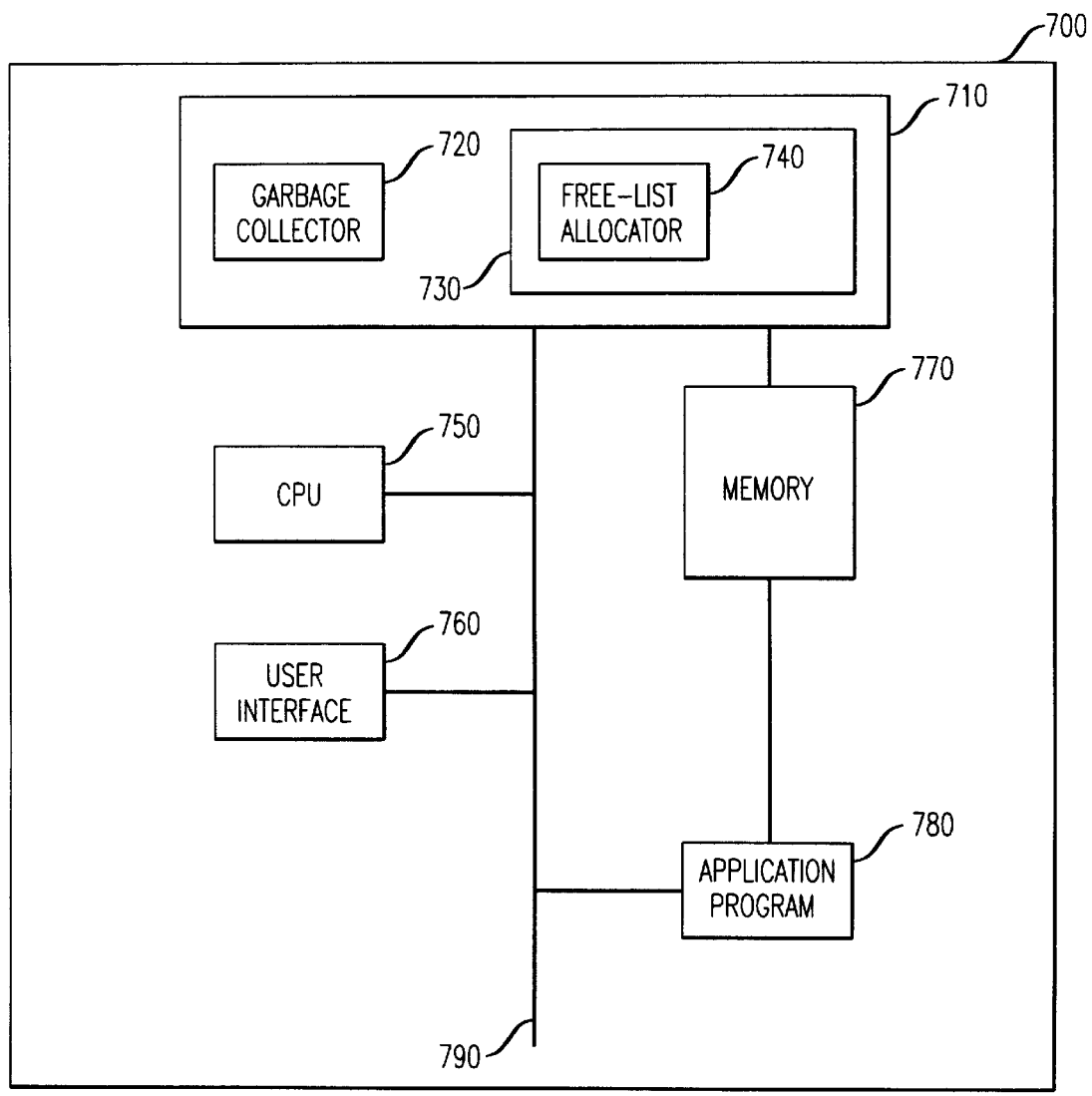
FIG. 7 shows a block diagram of an illustrative computer system for using a garbage collector configured in accordance with the principles of the invention.

More particularly, FIG. 2 shows a flowchart of illustrative steps 200 for implementing garbage collection in accordance with the principles of the invention. Our garbage collection technique uses a conventional free-list allocator which maintains a list of blocks of memory of, e.g., in a computer system such as shown in FIG. 7 and as will be discussed later herein. In accordance with an embodiment of the invention, initialization of the free-list allocator (block 205) occurs such that the free-list allocator divides the available memory for free-list allocation into one or more so called "free blocks". The identified free blocks are linked during the initialization (block 205) to form a so called free list. As will be further discussed below, a request for storage (e.g., access to an object) by, e.g., an executing application (hereinafter alternatively referred to as "the mutator" or "mutator process") will cause a scan of the free list to occur to determine if there is a memory block available to satisfy the storage request. If such a memory block presently is available, the allocator will remove the particular block from the free-list and give it, i.e., provide access to, the mutator. As will be further discussed below, when the allocated block is identified by the sweeper of our garbage collector, the block is again placed on the free-list for allocation.

In accordance with an embodiment of the invention, our garbage collector operates in so called epochs. As used herein, an epoch designates a particular time sequence during which garbage collection will occur in accordance with the principles of the invention. As will be appreciated, there may be more than one epoch sequence during the execution of an application program and the corresponding garbage collection. In accordance with this embodiment of the invention, each epoch creates concurrent threads (block 210) for execution of the mutator, marker (hereinafter alternatively referred to as "the marker" or "marker process") and sweeper (hereinafter alternatively referred to as "the sweeper" or "sweeper process"). In accordance with the invention, a series of colors is employed, in particular three colors, which facilitate the collection of garbage without fine-grain synchronization or atomicity. The way in which our invention achieves this result will become apparent from the detailed discussion below.

In accordance with an embodiment the invention, a current epoch color is assigned (block 215), illustratively, in accordance with the function:

(a) COLOR (i)=i mod 3, where i is a positive integer value representing the number of the current epoch.

As will be appreciated, defining the current epoch color in accordance with the well-known "mod" mathematical operation ensures a remainder of 0, 1 or 2 will result in applying the illustrative function COLOR(i) to facilitate individual color assignment. Having assigned the color of the current epoch (block 215) as described above, the concurrent execution of the threads, i.e., the mutator process, the marker process and the sweeper process, begins (block 220). As the start of the concurrent execution, the mutator, marker and sweeper are all initialized with particular colors (blocks 225, 230 and 235, respectively), each of which is defined as a function of the current epoch color. In particular, the mutator is initialized (block 225) with a color (hereinafter "the mutator color") which is the same as the current epoch color determined, illustratively, in accordance with COLOR(epoch), where the variable "epoch" is assigned an integer value. As will be appreciated, the function mapping, e.g., COLOR(epoch), is to be understood as an instantiation of the previously described COLOR(i) function, and hereinafter we will refer to other such instantiations of the function COLOR(i) in the same function mapping terms.

As described previously, the mutator requires access to and use of certain objects during the course of its mutation (block 290), i.e., execution. As such, the mutator allocates particular objects for which it requires access from the free-list allocator. Objects which are allocated by the mutator during a particular epoch are designated with the mutator color. In accordance with the preferred embodiment of the invention, objects designated with the mutator color retain this particular color through at least the end of the current epoch. Significantly, in accordance with the invention, the mutator is unaware of the color designations associated with the marker and/or sweeper. That is, the mutator is only concerned with the allocation of objects using the mutator's designated color.

Concurrently executing with the above-described mutator, in accordance with the invention, are the marker process and the sweeper process. As with the mutator, the marker is initialized with its own color (block 230). In accordance with the invention, during the current epoch, the marker is initialized with a color (hereinafter "the marker color") determined as a function of the current epoch's mutator color. Illustratively, the marker's color is determined in accordance with the function mapping COLOR (epoch-1). Further, illustratively, the variable "epoch" is an integer variable holding the current epoch number. Again, by way of review, COLOR(i) is a function where i is a variable. For example, COLOR(epoch-1) is the value, i.e., 0, 1 or 2, obtained when substituting "epochI" for i resulting in the mathematical relation: COLOR(epoch-1)=(epoch-1) mod 3. Thereafter, the marker brings all reachable objects from the prior epoch up to current status. That is, the marker brings all objects which are reachable, i.e., still in use, by the mutator current by utilizing the marker color such that the data will be reachable by the mutator for use in, e.g., new data structures required by the continued execution of the mutator. Significantly, in accordance with the invention, once particular objects are initialized by the mutator, only the marker may thereafter alter the object's color thereby eliminating the need for fine-grain synchronization or atomicity between the mutator and marker.

Illustratively, the marker recursively traverses all live objects (block 240), as described above, which are reachable from the mutator's root set of the previous epoch. Thereafter, the root set is copied from the mutator at the end of the current epoch for use by the marker in the next epoch. More particularly, in accordance with invention, the marker can reach objects that have either the previous epoch's color (hereinafter alternatively referred to as the function mapping "COLOR(epoch-1)") or the current epoch's color (i.e., the mutator color as determined by the function mapping COLOR(epoch)). Therefore, in accordance with the invention, for each live object traversed by the marker (block 240) one of two possible operations occurs: (1) if the current designation of the object is the marker's color, the object's color is changed to the mutator's color and all other objects reachable from that object, e.g., children are recursively marked in a similar fashion; otherwise (2) if the object's color is the mutator's color, the object's color remains unchanged. In this case, the object was previously examined, during the current epoch, by the marker and this object along with its children are known to have been previously marked. Significantly, in accordance with invention, when the marker completes its traversal of live objects (block 240) as described above, an invariant holds that all reachable objects have the mutator color. Thus, in accordance the invention, during the current epoch the marker will not encounter any objects colored with the sweeper's color (as further described below) because at the end of the previous epoch (and corresponding previous marking phase) all reachable objects must have a designation in conformance with the marker's color. The net result is that the marker's only visible effect is to change colors of objects having the previous epoch's color.

As described above, during the current epoch, the marker will not encounter any objects colored with the sweeper's color. In accordance with the embodiment of the invention, the sweeper process is initialized (block 235) with a so called sweeper color. The sweeper color is derived as a function of the current epoch color, and in particular the sweeper color is illustratively derived using the function mapping COLOR(epoch-2). In accordance with the preferred embodiment of the invention, the sweeper traverses every object (block 245) in memory, e.g., the memory of the computer system executing the mutator. If an object has the current sweeper color that particular object may be collected, deallocated, and returned to the free-list. As will be appreciated, the reclamation of such an object is safe because neither the mutator nor the marker can reach it at that time, i.e., in the current epoch. Otherwise, if the object has the mutator's color, e.g., COLOR(epoch), or the previous epoch's color, e.g., COLOR(epoch-1), that particular object is skipped due to the fact that it is potentially in use and should not be deallocated.

Further, in accordance with an embodiment of the invention, objects having the marker's color, e.g., COLOR (epoch-1), will either be marked with the current epoch's color, e.g., COLOR (epoch), during the current epoch if reachable from the root set, or their color will remain unchanged signifying that the object has become garbage and can be later detected by the sweeper in the next epoch for reclamation as described above. Significantly, in accordance with the invention, there is no contention between the sweeper and mutator, nor between the sweeper and marker, during garbage collection since the sweeper reads colors but does not write colors. In this way, the only color that can change during a particular sweep is a marker color changing to a mutator color in accordance with the operations described above wherein only the marker may change an object's color.

During each epoch, e.g., epoch i, all objects colored by the value COLOR(i) are live because they were allocated by the mutator in the current epoch or were marked by the marker with COLOR(i) because they were reachable from the last root set. Further objects designated with the color defined by the value COLOR(i−1) may or may not be encountered at the end of the current epoch by the marker and marked with COLOR(i) depending upon whether or not the objects are reachable from the root set. In addition, objects designated with the color having value COLOR(i−2) will be reclaimed by the sweeper during the current epoch as these objects were not marked in the previous epoch since they were unreachable to the marker, and in turn, unreachable to the mutator as well.

Turning our attention back to FIG. 2, after traversal of the objects has occurred by the marker process and sweeper process (block 240 and 245, respectively) as described above, all three threads of execution (i.e., mutator, marker and sweeper) undergo, in accordance with an embodiment of the invention a so called barrier synchronization (block 250). Basically, the barrier synchronization is a "start-up" mechanism for individual garbage collection cycles to ensure that the mutator, marker and sweeper begin their concurrent operation at a common execution point. For example, the barrier synchronization may occur only after complete marker and sweeper passes have been completed. Illustratively, each of the concurrently executing processes enters the beginning of the barrier synchronization (block 250) when they complete their collection phase and the barrier is not exited, i.e., each thread in the barrier remains idle, until all threads have checked into the barrier. In accordance with the embodiment, all write operations (block 255) by all three threads must be completed before the barrier synchronization ends (block 260) to ensure that all objects which have been recolored by the marker during the current epoch are visible to the sweeper in the next epoch. Thereafter, the mutator thread is suspended (block 265) and the mutator's root set is copied and saved (block 270) for use in marking in the next epoch. In anticipation of the next epoch, the thread state is reset (block 275) and the colors are remapped (block 280). Illustratively, such remapping is achieved using an epoch counter and the COLOR(i) function to map an epoch to a color. More particularly, in accordance with an embodiment of the invention, the color remapping occurs at the boundaries between consecutive epochs. For example, our garbage collector's colors are exchanged as follows: COLOR(epoch) is remapped as COLOR(epoch-1), COLOR(epoch-1) is remapped as COLOR(epoch-2), and COLOR(epoch-2) is remapped as COLOR(epoch). After the colors are remapped (block 280), the next epoch begins (block 285).

FIG. 3 shows pseudo-code routine 300 for implementing a garbage collector in accordance with the principles of the invention. As will be appreciated, such pseudo-code can be converted in a conventional manner into source code using any of a number of standard computer programming languages for actual execution. For example, one could use the well-known C programming language (see, for example, B. W. Kernighan et al., *The C Programming Language, Second Edition*, Prentice Hall, Englewood Cliffs, N.J., 1988) for writing C computer source code useful in implementing an illustrative embodiment of the steps shown in FIG. 2 and as described above. As will be appreciated, such computer source code may be executed, e.g., in the computer system shown in FIG. 7, for realizing the advantages of the invention. As will be further appreciated, lines 301 through 303 are variable declaration statements for defining particular variables and relationships within pseudo-code routine 300. Lines 304 and 314 are well-known delimiters for defining a function as defined in lines 305 through 313 of FIG. 3. In accordance with an embodiment of the invention, lines 304 through 314 are executed, on an epoch-by-epoch basis, for providing a garbage collector in accordance with the principles of the invention as described previously. More particularly, lines 305 through 307 create the three concurrent threads of execution for the mutator, marker and sweeper, assign the initial colors thereto, and provide on an epoch-by-epoch basis the concurrent operation of: (i) the execution of the mutator; (ii) the execution of the marker for marking, with the current epoch's color all objects that were reachable in the previous epoch; and (iii) the reclaiming of any objects by the sweeper with the mutator color of two prior epochs. As discussed above, line 307 provides for the barrier synchronization between the marker and sweeper. Line 310 suspends the current execution of the mutator in anticipation of the next epoch, line 311 resets the root set, line 312 deletes the current threads used for the mutator, marker and sweeper, and line 313 advances the routine for providing garbage collection in the next epoch.

To further illustrate various aspects of the invention and their advantages as described above, FIG. 4 shows an illustrative collection of objects and their state transitions during garbage collection in accordance with the invention. More particularly, FIG. 4 shows an example of the traversal through a series of object transition states for a live object example 400, and a series of dead objects 405. In the illustrative embodiment of FIG. 4 and as will become apparent from the discussion below, the following is an illustration of the object color designations in accordance with the invention:

(1) In epoch i, white objects have the marker color, i.e., COLOR(i-1), and gray objects have the mutator color, i.e., COLOR(i). During this epoch, the sweeper will reclaim those objects having COLOR(i-2), i.e., black.

(2) In the next epoch, e.g., epoch i+1, in accordance with the invention, the colors are remapped such that the marker color is now gray, i.e., COLOR(i+1-1)= COLOR(i), the mutator color is now black, i.e., COLOR(i+1)=COLOR(i-2), and the sweeper color is white, i.e., COLOR(i+1-2)=COLOR(i-1).

(3) In the next epoch, e.g., epoch i+2, the colors are again remapped such that the marker color becomes black, i.e., COLOR(i+2-1)=COLOR(i-2), the mutator color becomes white, i.e., COLOR(i+2)=COLOR(i-1), and the sweeper color becomes gray, i.e., COLOR(i+2-2)= COLOR(i).

While the illustrative examples of the invention herein employ black, white and gray colors for depicting the state of the objects, the selection of such designations is merely illustrative for simplicity of explanation herein and not critical to the invention. For example, the colors could be alternatively designated red, white and blue, or, zero, one and two. The only necessity is to have some sort of distinction for the transitional phases of an object, e.g., from allocated to unallocated. Also, as will be understood from our discussion herein, the object color interpretation in accordance with the invention is distinct and enables the delivery of garbage collection without the use of fine-grain synchronization or atomicity.

Turning our attention to live object example 400, a series of object transition states 401-1 through 401-10 are shown which depict the different transitional states of live object 401, in accordance with the invention, through three consecutive epochs 410, 415, and 420, respectively. As to live object 401, just prior to entering the first epoch 410 (illustrative designated as epoch i), live object 401 has a white object transition state 401-1 indicating that the object has a live state thereby meaning that the object is currently allocated by the mutator. As will be understood from the prior discussion, the white color designation carried by live object 401 is derived, illustratively, as a function of the epoch number i using COLOR(i-1). As live object 401 enters epoch 410 its object transition state 401-2 initially remains white. In accordance with the invention, marker 425 and sweeper 430 execute concurrently during each of epoch 410, 415, and 420, respectively. Since it is live, object transition state 401-2 is visible to marker 425 during epoch 410 and is therefore marked by marker 425 with the mutator color designation as determined, illustratively, by COLOR (i), as shown by gray object transition state 401-3. As should be noted, and as discussed above, the current mutator color in epoch 410 is also the color determined, illustratively, by COLOR(i). Further, sweeper 430 is looking for black colored objects for reclamation as garbage since black is the current sweeper color as determined, illustratively, by COLOR(i-2). Live object 401 retains its gray designation through the end of epoch 410, thereby not subject to reclamation by sweeper 430, as shown by gray object state transition 401-4.

Upon entering the next epoch, e.g., epoch 415 (illustratively designated epoch i+1), live object 401 initially retains its gray designation (gray object transition state 401-5) from the end of the previous epoch, i.e., epoch 410. However, in accordance the invention, live object 401 is colored black (black object transition state 401-6) by marker 425 during epoch 415, the color being determined, illustratively, by COLOR(i+1), which is the mutator color designation of the current epoch. Further, sweeper 430, during epoch 415, is looking for white colored objects for reclamation as garbage since white is now the current sweeper color as determined, illustratively, by COLOR(i−2). Thus, live object 401 retains its black designation through the end of epoch 415, thereby not subject to reclamation by sweeper 430, as shown illustratively by black object transition state 401-7.

As before, upon entering the next epoch, e.g. epoch 420 (illustratively designated epoch i+2), live object 401 initially retains its black designation (black object transition state 401-8) from the end of the previous epoch, i.e., epoch 415, because the current marker color is black. Thereafter, in accordance the invention, live object 401 is colored white (object transition state 401-9) by marker 425 during epoch 420, the color being determined, illustratively, by COLOR (i+2) which is the mutator color of the current epoch. Sweeper 430 is now looking for gray colored objects for reclamation as garbage since gray is now the current sweeper color as determined, illustratively, by COLOR(i−2). Thus, live object 401 retains its white designation through the end of epoch 420, thereby not subject to reclamation by sweeper 430, as shown by white object state transition 401-10. As should be now apparent, live object 401 will carry its white designation to the next epoch in accordance with the invention. The above example described various aspects of the invention with regard to live objects and we will now discuss the invention in terms of dead objects.

FIG. 4 also shows the traversal of object transition states for a series of dead objects 405. As above, the same three consecutive epochs are depicted, 410, 415, and 420, respectively. In the illustrative arrangement of FIG. 4, dead object 405 has a black object transition state 405-1 just prior to entering epoch 410. Being dead, dead object 405 retains its black color (black object transition state 405-2) through the execution of marker 425 and is later reclaimed at, e.g., black object transition state 405-3 by sweeper 430. As described above regarding epoch 410, sweeper 430 is currently looking for black colored objects for reclamation as garbage since black is the current sweeper color as determined, illustratively, by COLOR(i−2). However, dead object 406 having white object transition state 406-1 has remained "unmarked" during epoch 410 and is subject to reclamation in the next epoch.

As discussed previously, in accordance with the invention, at the boundaries between consecutive epochs, our garbage collector's colors are remapped, i.e., exchanged. Illustratively, black is remapped as white, white is remapped as gray, and gray is remapped as black. Or, from an execution standpoint, an object with COLOR(i−2) entering epoch i will be reclaimed by that epoch's sweeper. Similarly, an object with COLOR(i−1) entering epoch i+1 is reclaimed by that epoch, as is an object with COLOR(i) entering epoch i+2. For example, turning our attention back to FIG. 4, dead object 405 enters epoch 410, e.g., epoch i, having black object transition state 405-1 with the color black being determined, illustratively, by COLOR(i−2). Thus, upon entering epoch 410, dead object 405 will be subject to reclamation by sweeper 430 at, e.g., black object transition state 405-3. Similarly, dead object 406, having white object transition states 406-1 through 406-3 with the color white being determined, illustratively, by COLOR(i−1), upon entering and during epoch 415, e.g., epoch i+1, is subject to reclamation by sweeper 430. Similarly, dead object 407, having gray object transition states 407-1 through 407-3 with the color gray being determined, illustratively, by COLOR(i), upon entering and during epoch 420, e.g., epoch i+2, is subject to reclamation by sweeper 430.

In accordance with a further embodiment of the invention, the functionality and advantages of our garbage collector can be extended to support so called "reference update". As is well-known, "state" in the form of mutable references, poses certain known problems for concurrent garbage collectors since a subgraph G' of a dynamic state graph G may become temporarily disconnected from G. Since a conventional collector's marking phase traverses G, subgraph G' may not be properly marked during garbage collection. Yet G' may later be reconnected during subsequent garbage collection cycles to G in a location already visited by the marker. In such a case, subgraph G' has become inaccessible to the marker before being marked. The result is that subgraph G''s data is incorrectly reclaimed by the sweeper while actually still live, i.e., allocated and not garbage.

The above-described reference update situation manifests itself in our garbage collector as described using the following illustration. During an epoch, e.g., epoch i, the mutator fetches the content v (v being a subgraph) of reference cell r. The mutator retains v, e.g., in a register, before updating r with v' (v' being a subgraph). That is, the mutator redirects r's link from pointing to v to pointing to v'. Thus, data reachable from v is still live, but potentially inaccessible to the marker since the mutator may have altered the graph reachable from the roots. That is, r may have held the only reference to v and the marker may not have reached and marked v, through r, before the mutator replaced it with v'. In a further embodiment of the invention, our garbage collector calls for the mutator to communicate the replaced content v as a root to the concurrently running marker thread. That is, the marker will possess this new root set before the next epoch, e.g., epoch i+1, can begin. Significantly, in accordance with of the embodiment of the invention, the collector requires that the replaced object be marked as opposed to the target of the redirection being marked. Thus, in accordance with this embodiment of the invention, the potential problems associated with reference update are addressed.

FIG. 5 shows pseudo-code routine 500 for implementing a further embodiment of the invention to support reference update. As discussed above, pseudo-code routine 500 can be converted in a conventional manner into source code using any of a number of standard computer programming languages. In accordance with this embodiment, before an update to a reference occurs, the mutator places the current content of the reference in a so called "store set." The marker marks particular elements in the store set in the same manner as it marks roots in the root set. Basically, pseudo-code routine 500 of FIG. 5 is similar to pseudo-code routine 300 of FIG. 3, with the addition of code block 510 and line 511 to support the reference update aspect of this embodiment of the invention. Again, as will be appreciated, source code derived from pseudo-code routine 500 may be executed in the computer system of FIG. 7 for realizing a garbage collector in accordance with the invention.

As discussed previously, the invention herein facilitates concurrent garbage collection without the need for fine-grain synchronization or atomicity between the mutator, marker and sweeper. To insure the elimination of fine-grain synchronization and atomicity in the above described embodiment of the invention which supports reference update, the store set is implemented as a non-blocking store list. That is, in accordance with a further embodiment of the invention, during the garbage collection process with respect to a particular epoch, the mutator constructs a linked list of store roots such that new store roots are inserted at the head of the linked list. The marker traverses the linked list until it revisits a position in the linked list that is previously visited. The marker will view the store list as "empty" when it contains no elements, or when the marker's store-list traversal ends at the head of the linked list. As will be appreciated, the store set, in certain instances, may go non-empty as the mutator inserts additional roots. Thereafter, when the epoch completes its garbage collection phase, the store list is reset to the physically empty list for use by the next epoch. FIG. 6 represents illustrative C computer source code 600 for implementing the illustrative asynchronous write barrier in the above described embodiment of the invention. As is apparent, source code 600 provides non-blocking set functions for realizing the illustrative asynchronous write barrier without any explicit synchronization even though the mutator may insert roots, e.g., code block 615, to the root set while the marker concurrently removes roots, e.g., code block 610.

FIG. 7 shows a block diagram of an illustrative computer system 700 using a garbage collector in accordance with the principles of the invention. In particular, computer system 700 has operating system 710 with garbage collector 720, configured in accordance with the principles of the invention, and memory routines 730 for providing memory allocation in well-known manners. In addition, memory routines 730 include free-list allocator 740 for use by garbage collector 720 and memory 770 in implementing various embodiments of the invention as described previously. Central processing unit (CPU) 750 is illustrative of any microprocessor for executing application programs such as application program 780. While computer system 700 is illustratively shown having a single CPU, e.g., CPU 750, it will be understood that the principles of the invention are not limited to a single CPU and are equally applicable in a computer system having more than one CPU. As will be appreciated, memory 770 is used for storing, e.g., objects accessed during the execution of application program 780. As will be further appreciated, bus 790 is used for, among other things, input and output throughout the computer system 700 and including user interface 760 which provides the interface in a conventional manner to users of computer system 700.

The foregoing merely illustrates the principles of the present invention. Those skilled in the art will be able to devise numerous arrangements which, although not explicitly shown or described herein, embody those principles and are within their spirit and scope.

We claim:

1. A method for managing a memory of a computer system, the memory storing a plurality of objects, the method comprising the steps of:

executing a mutator process for accessing and using particular ones of a plurality of free objects in the memory of the computer system to form a plurality of allocated objects, each object of the plurality of allocated objects carrying a first designation associated with the mutator process;

concurrently with the step of executing the mutator process, executing a marker process for examining the plurality of allocated objects and, for each allocated object of the plurality of allocated objects which is still in use by the mutator process, changing the first designation carried by the allocated object to a second designation, the second designation associated with marker process and being determined as a function of the first designation;

concurrently with the steps of executing the mutator process and executing the marker process, executing a sweeper process for examining the plurality of objects to identify a plurality of unused objects from the plurality of objects, each of the plurality of unused objects carrying a third designation recognizable only by the sweeper process;

collecting the plurality of unused objects and returning them to the plurality of free objects; and exchanging, the first designation with the third designation, the second designation with the first designation, and the third designation with the second designation.

2. A method for collecting objects in a memory of a computer system, the memory including a plurality of objects, the method comprising the steps of:

identifying a plurality of free objects from the plurality of objects in the memory;

executing a first process which during its execution uses particular ones of the plurality of free objects, the first process referencing the particular ones of the plurality of free objects in use by the first process with a first designation to form a plurality of allocated objects;

executing a sequence of garbage collection cycles in the computer system for identifying and collecting a plurality of unused objects, and for each garbage collection cycle of the sequence of garbage collection cycles:

providing the first process with a second designation for use in the referencing of the particular ones of the plurality of free objects, the second designation replacing the first designation;

executing, concurrently with the first process, a second process for traversing the plurality of allocated objects and marking particular ones of the plurality of allocated objects with the second designation which are still in use by the first process;

executing, concurrently with first process and the second process, a third process for traversing the plurality of objects in the memory and collecting particular ones of the plurality of objects having a third designation to form the plurality of unused objects;

returning the plurality of unused objects to the plurality of free objects; and exchanging, prior to entering the next garbage collection cycle of the sequence, the first designation with the third designation, the second designation with the first designation, and the third designation with the second designation.

3. The method of claim 2 wherein the first designation, the second designation and the third designation are each determined using a function (i mod 3), where i is a integer value corresponding to a particular garbage collection cycle of the sequence of garbage collection cycles and the function (i mod 3) is a modular integer arithmetic operation returning a remainder of i divided by 3.

4. The method of claim 3 wherein the integer value is selected from the group: 0, 1 and 2.

5. The method of claim 2 including the further step of:

periodically suspending the execution of the first process and copying particular ones of the plurality of allocated objects to a designated location in the memory.

6. The method of claim 2 wherein the computer system includes a plurality of processors such that the executing the first process step occurs in a first one of the plurality of processors, and the executing the second process step and the executing the third process step occur in a second one of the plurality of processors.

7. The method of claim 2 wherein the third designation is a function of the second designation used by the first process during a particular garbage collection cycle in the sequence which occurred two garbage collection cycles prior to a current garbage collection cycle of the sequence.

8. The method of claim 1 wherein the executing the marker process step includes the further step of:

replacing the first designation with the second designation, during the examining the plurality of objects by the marker process, for use by the mutator process in the accessing of the particular ones of the plurality of objects.

9. The method of claim 1 wherein the third designation is a function of the first designation and the second designation.

10. The method of claim 1 wherein the first designation, the second designation and the third designation are each determined using a function (i mod 3), where i is a integer value corresponding to a particular garbage collection cycle of a sequence of garbage collection cycles in the computer system and the function (i mod 3) is a modular integer arithmetic operation returning a remainder of i divided by 3.

11. The method of claim 10 wherein the third designation is a function of the second designation used by the first process during a particular garbage collection cycle in the sequence which occurred two garbage collection cycles prior to a current garbage collection cycle of the sequence.

12. The method of claim 10 wherein the exchanging step occurs between each garbage collection cycle of the sequence of garbage collection cycles.

* * * * *